(12) United States Patent
Nguyen

(10) Patent No.: US 9,293,985 B2
(45) Date of Patent: Mar. 22, 2016

(54) METHOD OF REDUCING INPUT CURRENT DISTORTION IN A RECTIFIER

(71) Applicant: Hamilton Sundstrand Corporation, Charlotte, NC (US)

(72) Inventor: Vietson M. Nguyen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 301 days.

(21) Appl. No.: 13/918,516

(22) Filed: Jun. 14, 2013

(65) Prior Publication Data

US 2014/0369092 A1   Dec. 18, 2014

(51) Int. Cl.
 *H02M 7/219* (2006.01)
 *H02M 1/42* (2007.01)
 *H02M 1/12* (2006.01)

(52) U.S. Cl.
 CPC ............ *H02M 1/4233* (2013.01); *H02M 7/219* (2013.01); *H02M 1/12* (2013.01)

(58) Field of Classification Search
 CPC .................... H02M 7/219; H02M 2007/2195; H02M 1/12; H02M 2001/123; H02M 7/125; H02M 7/217
 See application file for complete search history.

(56) References Cited

U.S. PATENT DOCUMENTS

| 5,892,674 A | 4/1999 | Shimada et al. |
| 2003/0128563 A1* | 7/2003 | Rojas Romero ................. 363/89 |
| 2006/0215425 A1* | 9/2006 | Fu et al. .......................... 363/37 |

FOREIGN PATENT DOCUMENTS

| EP | 2509209 A2 | 10/2012 |
| EP | 2528221 A2 | 11/2012 |

OTHER PUBLICATIONS

Anonymous: "A number from a set divided by the average of the set?", Askvile by Amazon, Jan. 31, 2007, XP002731513, Retrieved from the Internet: URL:http://askville.amazon.com/number-set-divided-averageAnswerViewer./do?requestID=1036602 [retrieved on Oct. 23, 2014] * the whole document *.
Search Report and Opinion issued by the European Patent Office on Nov. 5, 2014 for European Patent Application No. 14172211.

* cited by examiner

*Primary Examiner* — Harry Behm
(74) *Attorney, Agent, or Firm* — Locke Lord LLP; Scott D. Wofsy; Christopher J. Cillié

(57) ABSTRACT

A method is disclosed for reducing input current harmonic distortion in a Vienna-type active rectifier that includes the steps of sensing voltage values from upper and lower halves of a DC bus associated with the rectifier, determining an average of the sensed voltage values, calculating upper and lower scale factors by dividing the sensed voltage values with the averaged sensed voltage value, rescaling a reference signal from a controller using the upper and lower calculated scale factors, and forward feeding the rescaled reference signal from the controller to a pulse width modulator to obtain a gate driver signal for power semiconductor switches of the rectifier.

11 Claims, 10 Drawing Sheets

METHOD OF REDUCING INPUT CURRENT DISTORTION IN A RECTIFIER

BACKGROUND OF THE INVENTION

1. Field of the Invention

The subject invention relates generally to active rectification, and more particularly, to a method of reducing input current distortion in a three-level Vienna-type active rectifier used in aerospace applications.

2. Description of Related Art

It has been determined that uni-directional active rectifiers, also known as a Vienna-type active rectifiers, are good candidates for use in aerospace applications in which there is a need to convert AC input voltage sources into dual DC-bus voltage. The dual DC-bus voltage can then be used to efficiently drive DC-AC three-level power converters/inverters such as, for example, the motor drive systems and battery charging systems employed on aircraft.

It has also been determined that harmonic distortion in the input currents to a Vienna-type active rectifier can exceed the power quality specifications for certain aerospace applications. This can occur at an input frequency range from 360 Hz up to 800 Hz (as in currently used aircraft CF and VF power systems).

It would be beneficial therefore, to minimize input current harmonic distortion in a Vienna-type active rectifier in order to achieve better power quality, and thereby meet the specifications for a given application.

SUMMARY OF THE INVENTION

The subject invention is directed to a new and useful method of reducing distortion in a rectifier, which includes the steps of sensing voltage values, calculating scale factors for the sensed voltage values, and then rescaling reference signals for a pulse width modulator (PWM) based on the scale factors to obtain gate driver signals for the rectifier.

Preferably, the step of sensing voltage values includes sensing voltage values from upper and lower halves of a DC bus associated with the rectifier. The step of calculating scale factors for the sensed voltage values includes the step of determining an average of the sensed voltage values, and the step of determining an average of the sensed voltage values includes the steps of summing the sensed voltage values and dividing the sum by two.

The step of calculating scale factors for the sensed voltage values includes the step of dividing the sensed voltage values with the averaged sensed voltage value, and the step of rescaling reference signals for a pulse width modulator includes the step of rescaling a reference signal from a controller using the calculated scale factors.

The method further includes the step of forward feeding the rescaled reference signal from the controller to a pulse width modulator to obtain a gate driver signal for power semiconductor switches of the rectifier.

The subject invention is also directed to a method of reducing input current harmonic distortion in a Vienna-type active rectifier having power semiconductor switches. The method includes the steps of sensing voltage values from upper and lower halves of a DC bus associated with the rectifier and determining an average of the sensed voltage values by summing the values and dividing the sum by two.

The method further includes the steps of calculating upper and lower scale factors by dividing the sensed voltage values with the averaged sensed voltage value and rescaling a reference signal from a controller using the upper and lower calculated scale factors to minimize effects of third harmonic voltage ripples on the upper and lower halves of the DC bus. The method also includes the step of forward feeding the rescaled reference signal from the controller to a pulse width modulator to obtain a gate driver signal for the power semiconductor switches of the rectifier.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

The subject invention is directed to a method of reducing input current harmonic distortion in a Vienna-type active rectifier. More particularly, the subject invention relates to a method of reducing input current harmonic distortion in an active rectifier that has been modified to meet certain power quality and input side EMI specifications for particular aerospace applications.

In the course of designing the subject active rectifier, it was determined through testing that the input current to the rectifier exceeded the power quality specifications for a certain aerospace application in the input frequency range from 360 Hz up to and above 400 Hz. Upon further analysis, it was determined that the harmonic distortion in the input currents was created by the third order harmonic voltages that appeared on the top and bottom halves of the DC buses as a result of half-wave current rectification.

A simulation showed that when voltages of the top and bottom halves of the DC bus are sensed and then fed-forward into the pulse width modulator (PWM), the PWM duty-cycle is varied depending on the third order harmonic voltage ripples on the halves of the DC bus.

Figure 1:
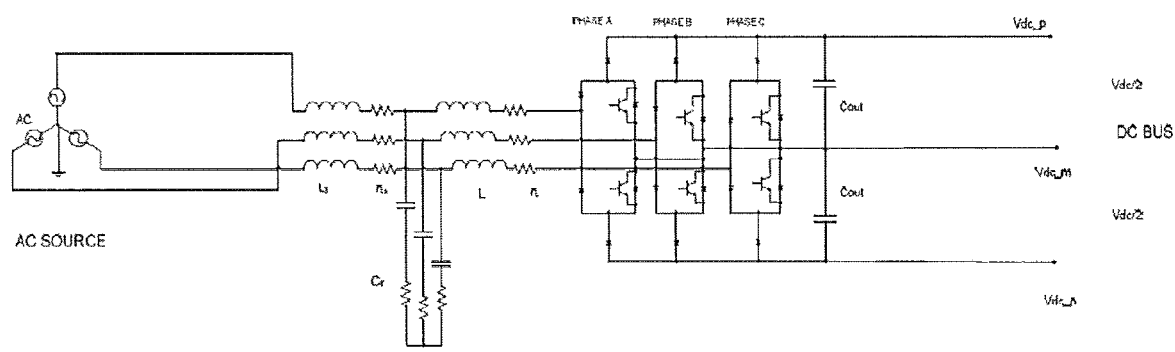
FIG. 1 is a schematic representation of a voltage source version of a Vienna-type active rectifier.

Turning now to the drawings to illustrate the current distortion problem considered herein and the way in which that problem was solved using a model and simulation tool, there is illustrated in FIG. 1 a schematic representation of a voltage source version of a Vienna-type active rectifier. A Vienna-type rectifier is a unidirectional three-phase three-switch three-level pulse-width modulation (PWM) rectifier.

Figure 2:
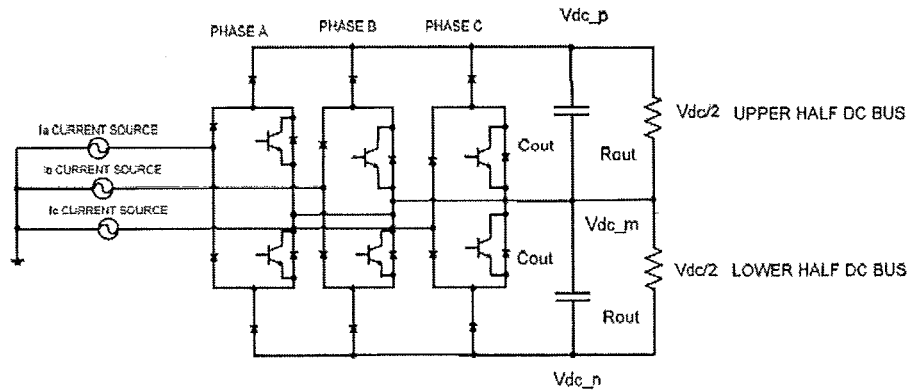
FIG. 2 is a current source interpretation of a Vienna-type active rectifier.

Those skilled in the art will readily appreciate that a voltage source version of a Vienna-type active rectifier in series with an impedance (e.g., a filter) can be interpreted as a current source, as illustrated in FIG. 2.

Figure 3:
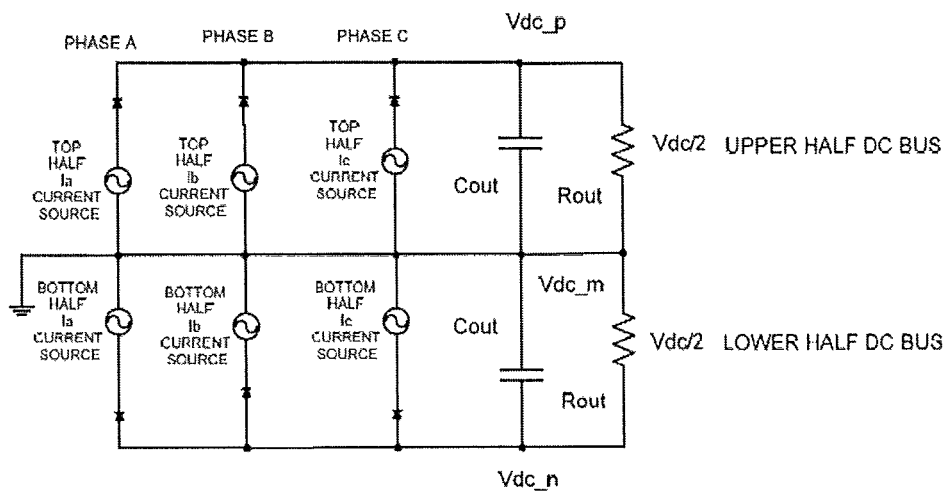
FIG. 3 is a simplified current diagram illustrating the current injection into the top and bottom halves of the DC bus.

As shown in FIG. 3, the current diagram of FIG. 2 can be further simplified to illustrate the current injection into the top-half and bottom-half of the DC bus. From this diagram, those skilled in the art will readily appreciate why the third order harmonic ripples appear on both halves of the DC bus and the two third harmonic voltage ripples are out-of-phase with each other.

Figure 4:
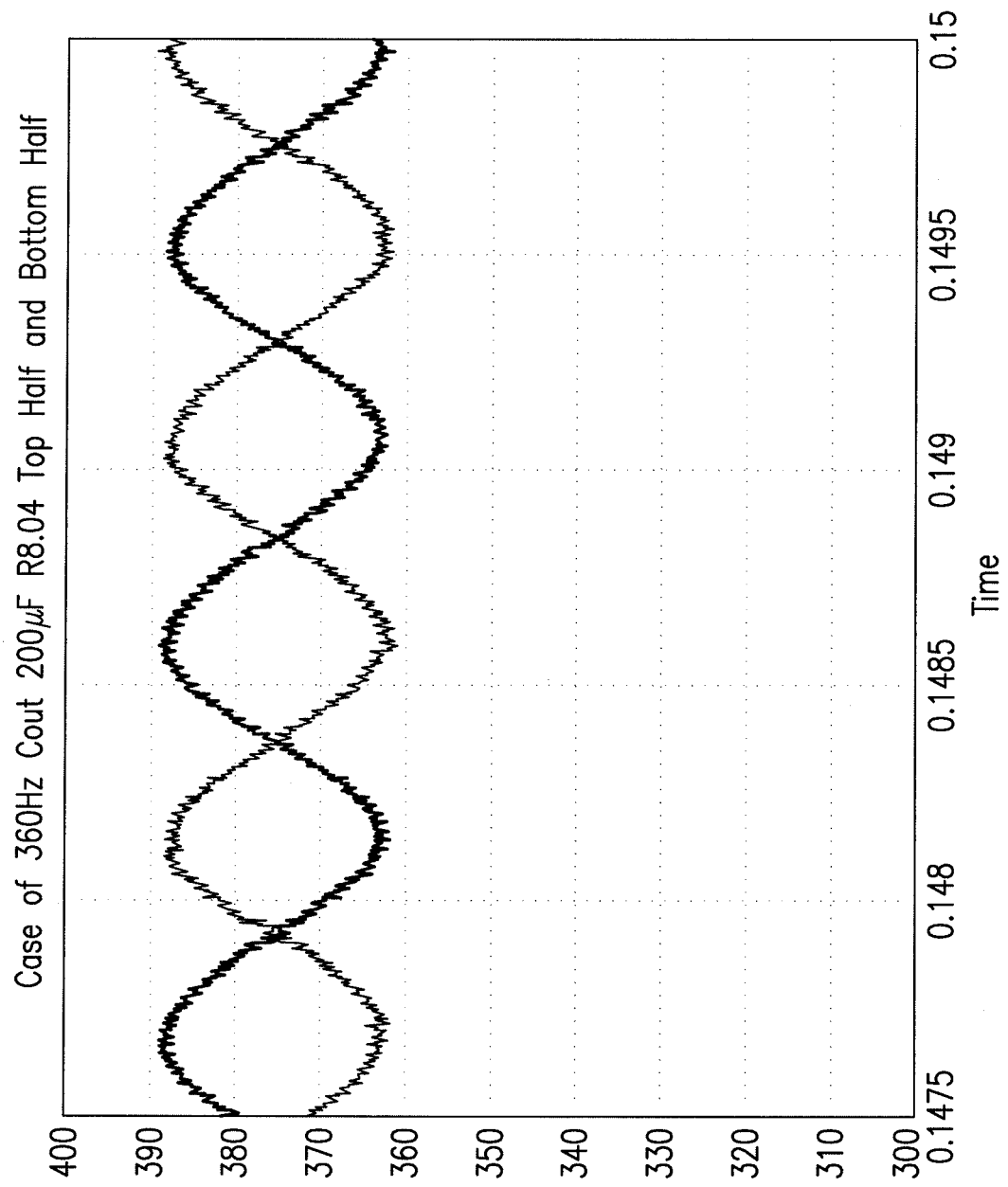
FIG. 4 is a graphical illustration of the top and bottom halves of the DC bus voltage with third harmonic ripples.

Indeed, FIG. 4 illustrates the top and bottom halves of the DC bus voltage with third order harmonic ripples 180° out of phase from each other. In the simulation results, for the top and bottom halves of the DC bus, the input frequency is 360 Hz, $C_{out}$ is 200 μF and the $R_{out}$ is 8.04.

Figure 5:
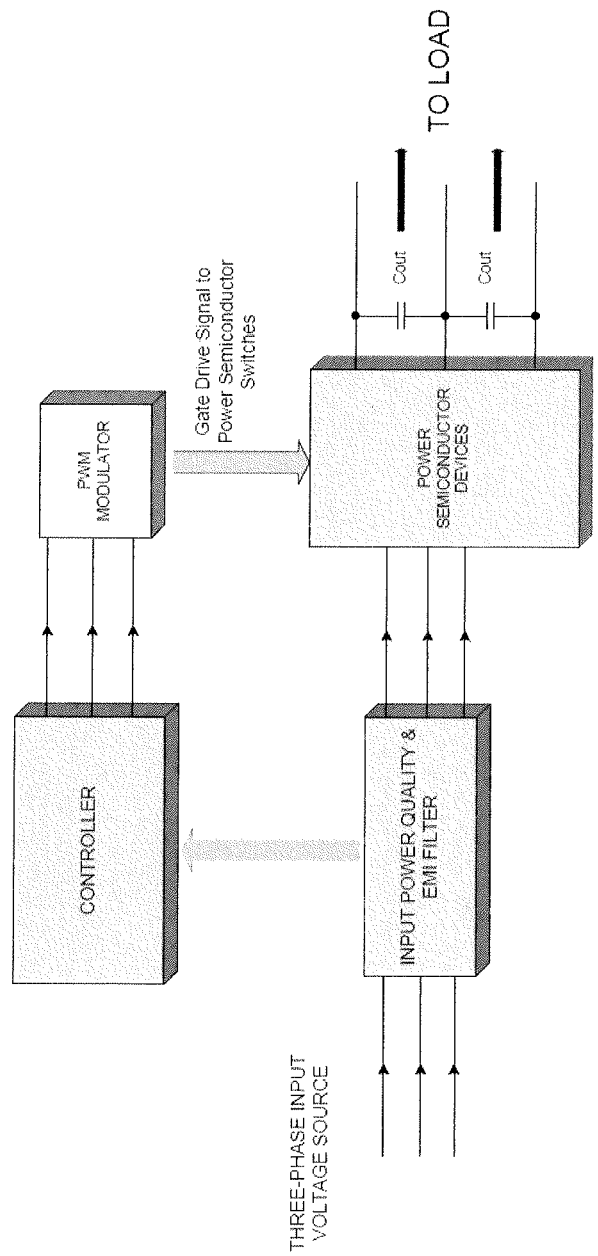
FIG. 5 is a block diagram of a Vienna-type active rectifier system.

FIG. 5 shows the block diagram of a Vienna-type rectifier in which a controller and a PWM modulator are included. In this system, the voltages of the top and bottom halves of the DC bus are sensed and then fed-forward into the pulse width modulator (PWM) which generates gate drive signals for the power semiconductor switches of the rectifier.

Figure 6:
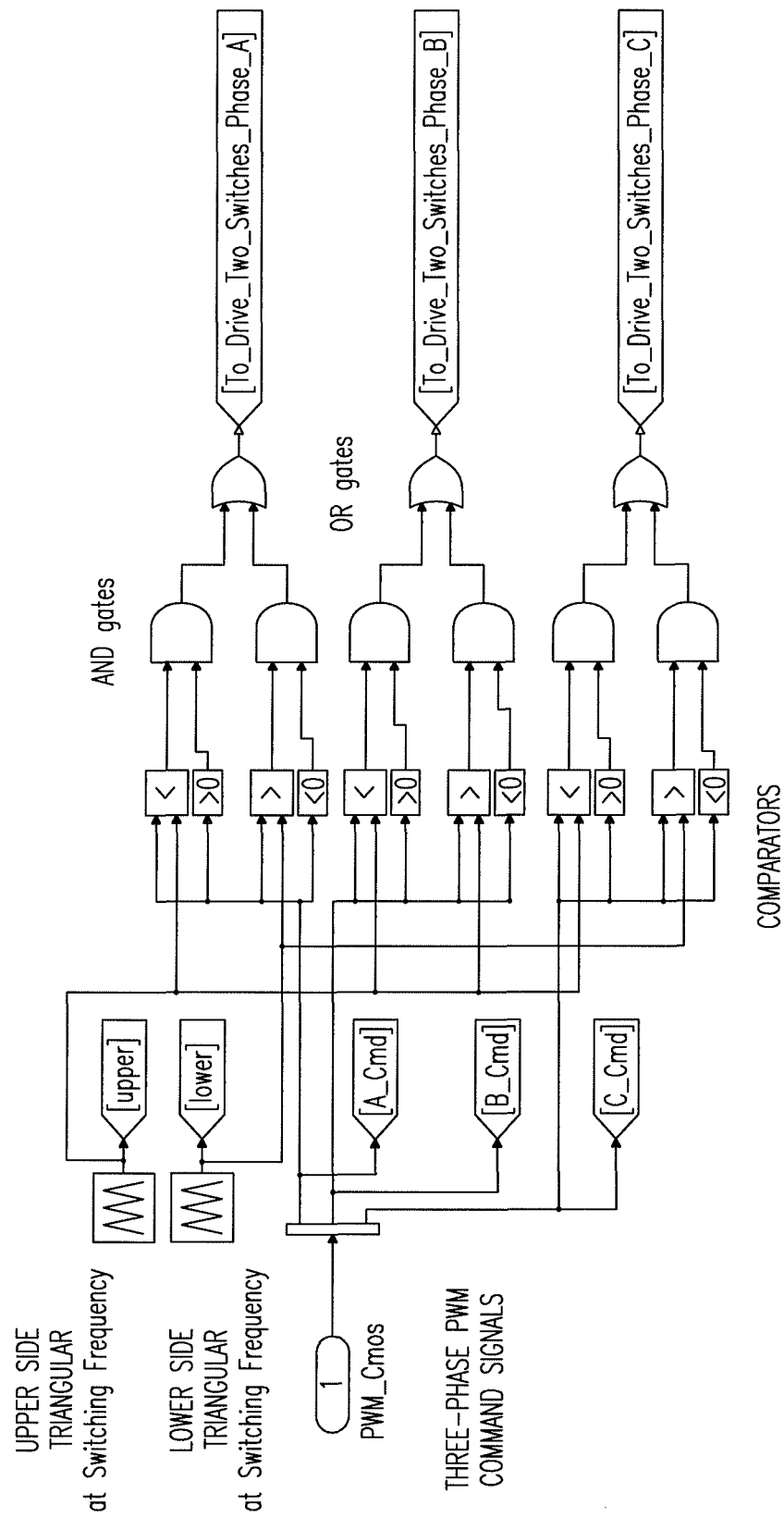
FIG. 6 is a block diagram of a prior art pulse-width-modulation (PWM) modulator with an illustration of the two signals of "upper" and "lower" triangular waveforms shown therewith in FIG. 6A.
Figure 6A:
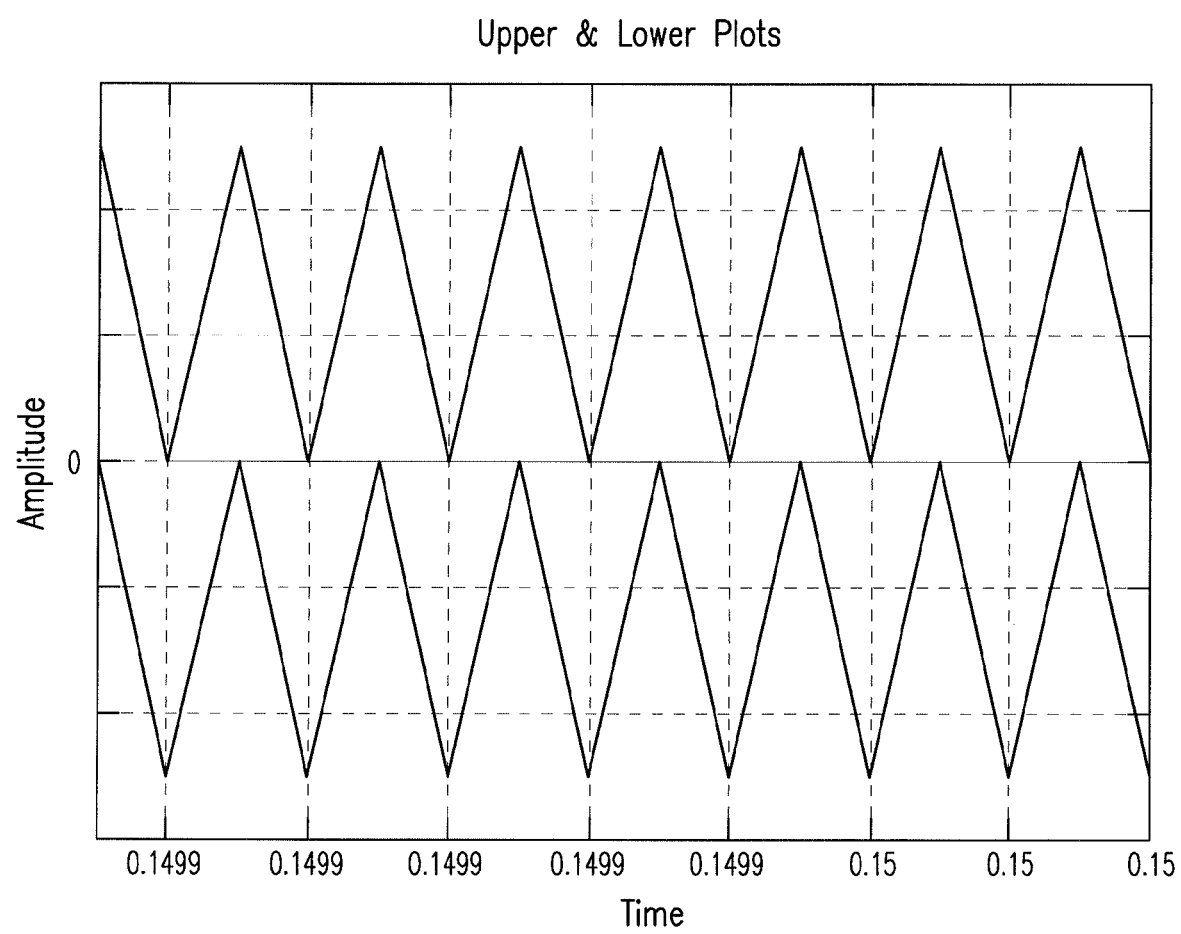

Referring now to FIG. 6, there is illustrated the block diagram of a prior art PWM modulator for an active rectifier system as shown in FIG. 5, with the two signals of "upper" and "lower" triangular waveforms shown in FIG. 6A. That is, prior to modification in accordance with the subject invention. In this instance, the logic output for the comparator block is as follows:

For a comparator block with two inputs: If the upper input compared to the lower input meets the block operation ("equal", "not equal", "lesser than", "lesser than or equal", "greater than" and "greater than or equal") then the output logic will turn to be "1" or "TRUE." For a comparator block with only one input: If the input meets the operation described by the block, then the output is "1" or "TRUE."

Figure 7:
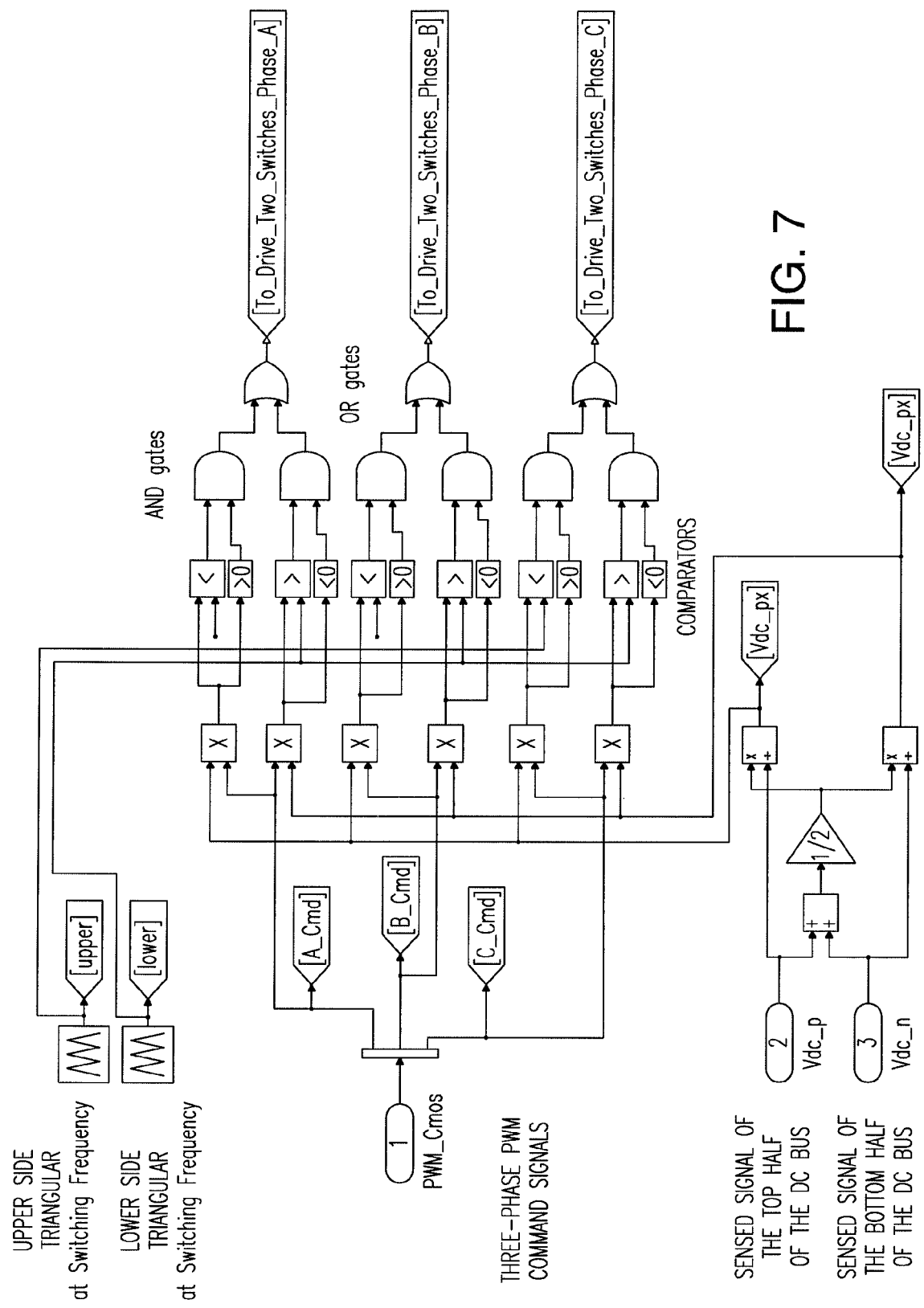
FIG. 7 is a block diagram of a modified pulse-width-modulation (PWM) modulator constructed in accordance with the subject invention.

By way of comparison, FIG. 7 illustrates a block diagram model of a PWM modulator that has been modified in accordance with the subject invention. In this model, the voltages of the top and bottom halves of the DC bus are sensed and then fed-forward into the pulse-width-modulation (PWM) modulator. Similar comparator logic is applied with this PWM modulator as described above for the prior art PWM modulator of FIG. 6.

Referring now to FIG. 7, for each phase of the rectifier it can be seen that the input voltages to the upper and lower halves [Vdc_p] and [Vdc_n] are summed and divided in half to obtain an average voltage value. The average voltage value is then used to calculate two scale factors [Vdc_px] and [Vdc_nx]. Scale factor [Vdc_px] relates to the upper half of the DC bus and scale factor [Vdc_nx] relates to the lower half of the DC bus. The two scale factors [Vdc_px] and [Vdc_nx] are calculated by dividing the sensed half-bus voltage with the DC average voltage. The reference value for each phase from the controller is then rescaled using the two scale factors [Vdc_px] and [Vdc_nx]. This is done by multiplying the two scale factors [Vdc_px] and [Vdc_nx] by the reference value from the controller.

In other words, the PWM command signal for each phase is scaled up (increased) when the corresponding half DC bus is decreased by the ripple and scaled down (decreased) when that DC half is increased by the ripple. The positive side of the PWM command corresponds to the top half of the DC bus and the negative side of that PWM command corresponds to the bottom half of the DC bus.

Those skilled in the art will readily appreciate that for a three-phase rectifier, the three-phase references from the controller would be rescaled with the corresponding scale factors obtained for each phase. The results would then be forward fed into the PWM modulator to obtain the actual PWM signals to drive the gates of the power semiconductor devices inside the Vienna-type active rectifier.

Figure 8:
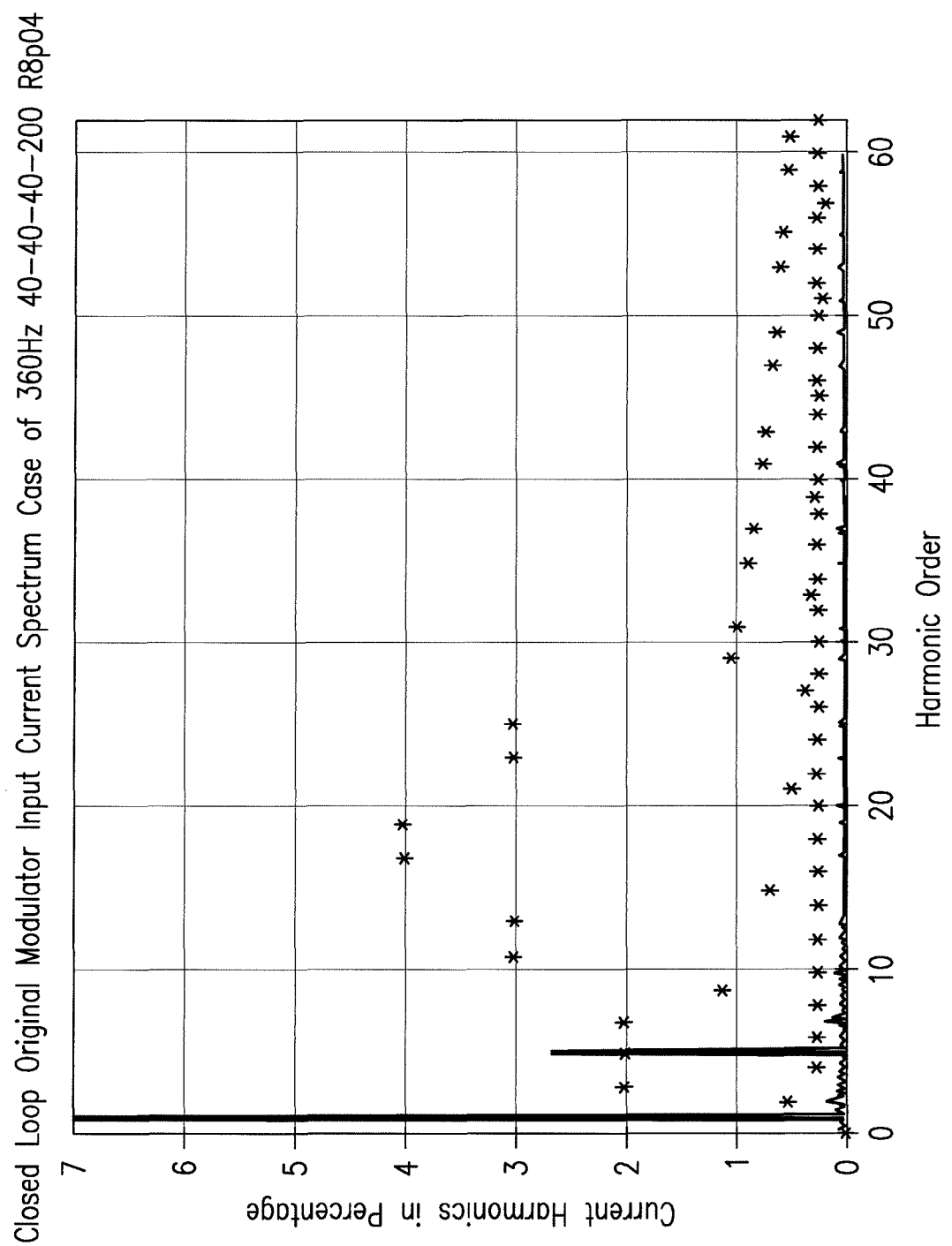
FIG. 8 is a graphical illustration showing input current harmonic distortion with the prior art PWM modulator of FIG. 6.
Figure 9:
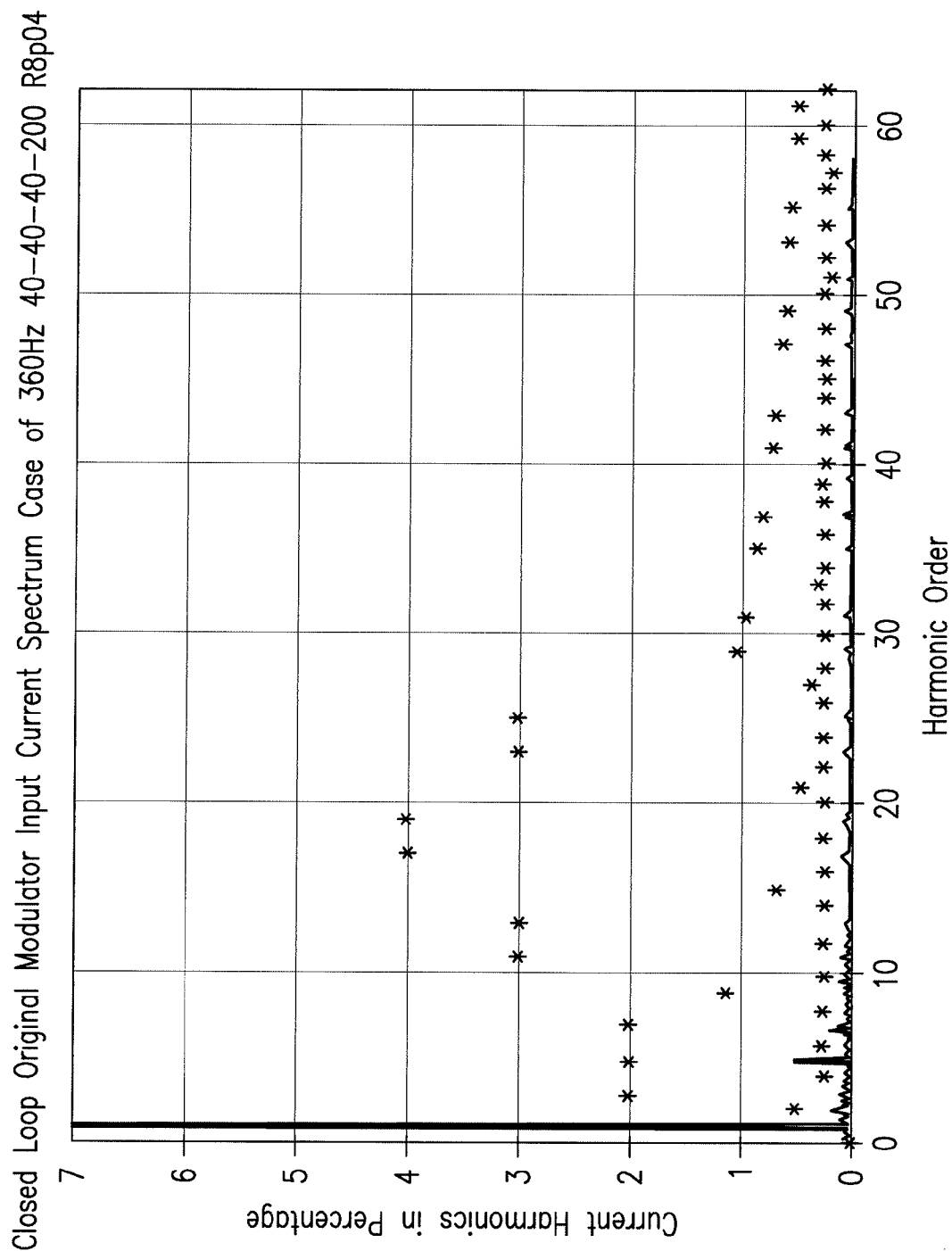
FIG. 9 is a graphical illustration showing input current harmonic distortion with the PWM modulator of FIG. 7.

In terms of results, it can be seen from FIG. 8 that there is a third order harmonic distortion in the input current of the prior art PWM of FIG. 6, but when employing the modified PWM of FIG. 7, it can be seen in FIG. 9 that the third order harmonic distortion in the input current is minimized.

Figure 10:
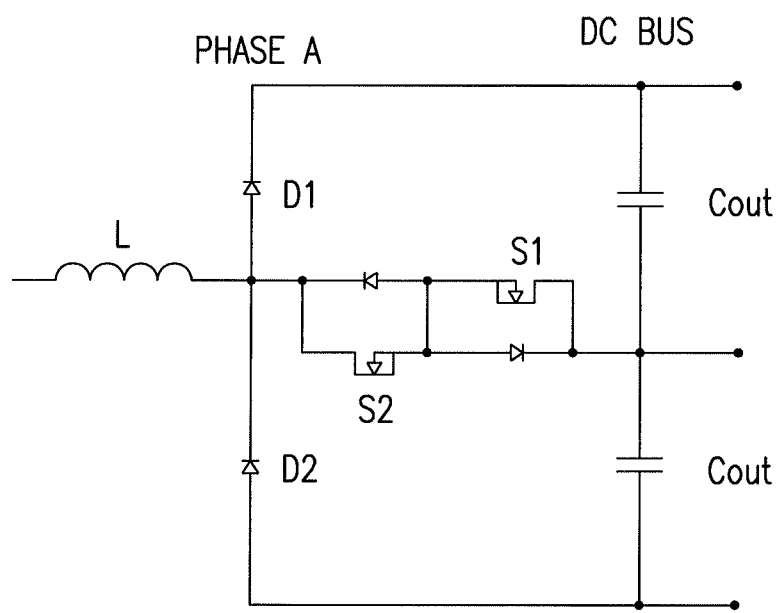
FIG. 10 shows a single phase (Phase A) illustration of another well-known three-phase circuit topology of the Vienna-type rectifier in which the harmonic reduction method of the subject invention is also applied.

Referring to FIG. 10, there is illustrated a single phase (Phase A) illustration of another well-known three-phase circuit topology of the Vienna-type rectifier in which the harmonic reduction method of the subject invention is also applied. More particularly, FIG. 10 illustrates a basic Y-clamped active rectifier that includes two clamped SiC Schottky diodes (D1 and D2) and a bidirectional switch containing two pairs of SiC Schottky diodes and SiC MOSFETs connected in parallel (S1 and S2).

In sum, a method has been disclosed to eliminate or otherwise minimize the effects of third order harmonic voltage ripples on two halves of the DC-buses of an active rectifier by bringing in feed-forward paths the two DC bus voltage signals to scale and modify the three reference signals coming out from the controller to the PWM modulator. As a result, the input current distortion would be minimized regardless of the value of output filter capacitors ($C_{out}$) and DC-side load currents.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A method of reducing distortion in a rectifier comprising the steps of:
   a) sensing voltage values;
   b) calculating scale factors for the sensed voltage values;
   c) rescaling reference signals for a pulse width modulator based on the scale factors to obtain gate driver signals for the rectifier,
   wherein the step of calculating scale factors for the sensed voltage values includes the step of determining an average of the sensed voltage values.

2. A method according to claim 1, wherein the step of sensing voltage values includes sensing voltage values from upper and lower halves of a DC bus associated with the rectifier.

3. A method according to claim 1, wherein the step of determining an average of the sensed voltage values includes the steps of summing the sensed voltage values and dividing the sum by two.

4. A method according to claim 3, wherein the step of calculating scale factors for the sensed voltage values includes the step of dividing the sensed voltage values with the averaged sensed voltage value.

5. A method according to claim 4, wherein the step of rescaling reference signals for a pulse width modulator includes the step of rescaling a reference signals from a controller using the calculated scale factors.

6. A method according to claim 5, further comprising the step of forward feeding the rescaled reference signal from the controller to a pulse width modulator to obtain a gate driver signal for power semiconductor switches of the rectifier.

7. A method of reducing input current harmonic distortion in a Vienna-type active rectifier, comprising the steps of:
 a) sensing voltage values from two halves of a DC bus associated with the rectifier;
 b) averaging the two sensed voltage values;
 c) calculating scale factors for the sensed voltage values;
 d) rescaling a reference signal from a controller using the calculated scale factors; and
 e) forward feeding the rescaled reference signal to a pulse width modulator to obtain a gate driver signal for a phase of the rectifier.

8. A method according to claim 7, wherein the step of averaging the two sensed voltage values includes the steps of summing the sensed voltage values from the two halves of the DC bus and dividing the sum by two.

9. A method according to claim 7, wherein the step of calculating scale factors for the sensed voltage values includes the step of dividing the sensed voltage values with the averaged sensed voltage value.

10. A method of reducing input current harmonic distortion in a Vienna-type active rectifier having power semiconductor switches, comprising the steps of:
 a) sensing voltage values from upper and lower halves of a DC bus associated with the rectifier;
 b) determining an average of the sensed voltage values;
 c) calculating upper and lower scale factors by dividing the sensed voltage values with the averaged sensed voltage value;
 d) rescaling a reference signal from a controller using the upper and lower calculated scale factors to minimize effects of third harmonic voltage ripples on the upper and lower halves of the DC bus; and
 e) forward feeding the rescaled reference signal from the controller to a pulse width modulator to obtain a gate driver signal for power semiconductor switches of the rectifier.

11. A method according to claim 10, wherein the step of determining an average of the sensed voltage values includes the steps of summing the sensed voltage values from the upper and lower halves of the DC bus and dividing the sum by two.

* * * * *